US012730093B2

(12) United States Patent
McQuillan et al.

(10) Patent No.: US 12,730,093 B2
(45) Date of Patent: Sep. 8, 2026

(54) SENSOR-BASED ULTRASONIC COUPLING LAYER EVALUATION AND RELATED USER INTERFACE FUNCTIONALITY

(71) Applicant: QUALCOMM Incorporated, San Diego, CA (US)

(72) Inventors: Kaylin McQuillan, Buffalo, NY (US); Nicholas Buchan, San Jose, CA (US); Stephen Michael Gojevic, Lockport, NY (US); Chin-Jen Tseng, Fremont, CA (US); Ila Badge, San Jose, CA (US); Emily Kathryn Brooks, Amherst, NY (US); Ye Zhan, Buffalo, NY (US); John Keith Schneider, Williamsville, NY (US)

(73) Assignee: QUALCOMM Incorproated, San Diego, CA (US)

( * ) Notice: Subject to any disclaimer, the term of this patent is extended or adjusted under 35 U.S.C. 154(b) by 283 days.

(21) Appl. No.: 18/436,337

(22) Filed: Feb. 8, 2024

(65) Prior Publication Data

US 2025/0258143 A1 Aug. 14, 2025

(51) Int. Cl.
*G01N 29/28* (2006.01)
*G01N 29/06* (2006.01)

(52) U.S. Cl.
CPC ......... *G01N 29/28* (2013.01); *G01N 29/0645* (2013.01); *G01N 29/0654* (2013.01); *G01N 2291/023* (2013.01)

(58) Field of Classification Search
CPC ............... G01N 29/28; G01N 29/0645; G01N 29/0654; G01N 2291/023; A61B 8/4281
See application file for complete search history.

(56) References Cited

U.S. PATENT DOCUMENTS

| | | | | |
|---|---|---|---|---|
| 2018/0276439 | A1* | 9/2018 | Strohmann | G06F 1/169 |
| 2019/0069842 | A1* | 3/2019 | Rothberg | A61B 8/4245 |

OTHER PUBLICATIONS

International Search Report and Written Opinion—PCT/US2024/058534—ISA/EPO—Feb. 27, 2025.

* cited by examiner

*Primary Examiner* — David Z Huang
(74) *Attorney, Agent, or Firm* — Weaver Austin Villeneuve & Sampson LLP

(57) ABSTRACT

Some disclosed methods involve controlling an apparatus that includes an ultrasonic receiver system. Some such methods involve receiving ultrasonic sensor data from the ultrasonic receiver system and detecting, based at least in part on the ultrasonic sensor data, one or more imperfections in, on or proximate an adhesive ultrasonic coupling layer on an outer surface of the apparatus. Some such methods involve controlling a user interface system to provide a prompt to adjust or replace the adhesive ultrasonic coupling layer responsive to detecting the one or more imperfections in, on or proximate the adhesive ultrasonic coupling layer.

21 Claims, 8 Drawing Sheets

*Figure 2A*
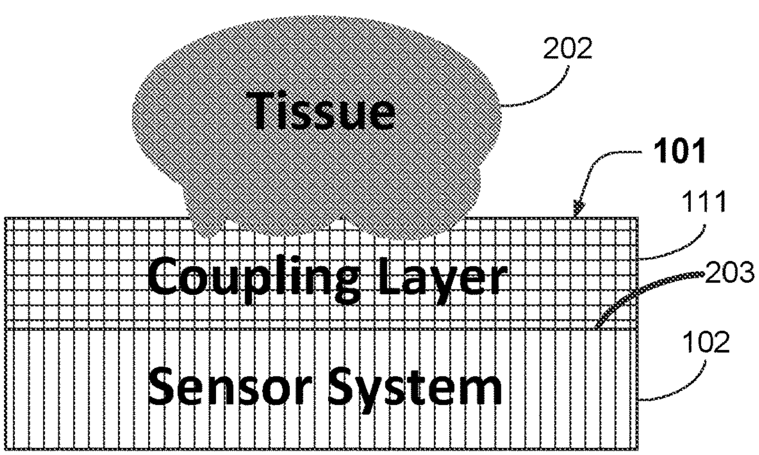
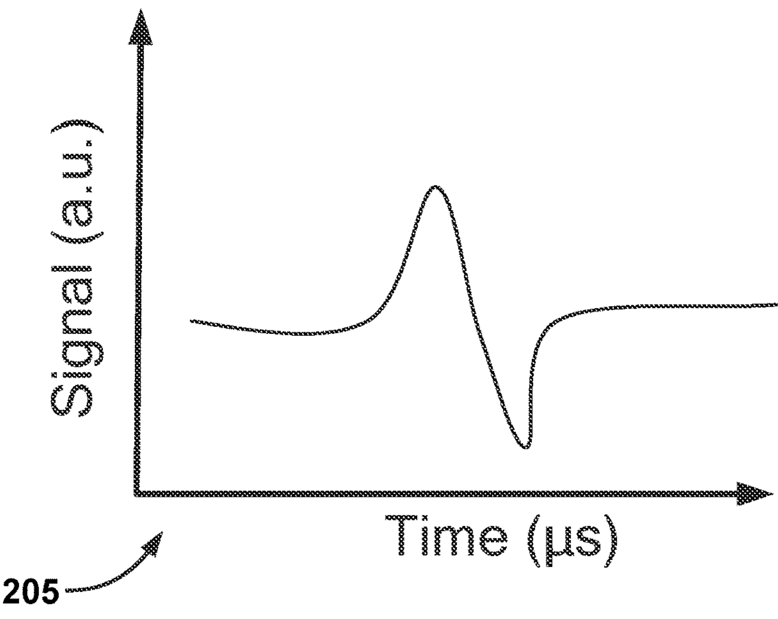
*Figure 2B*

*Figure 3A*
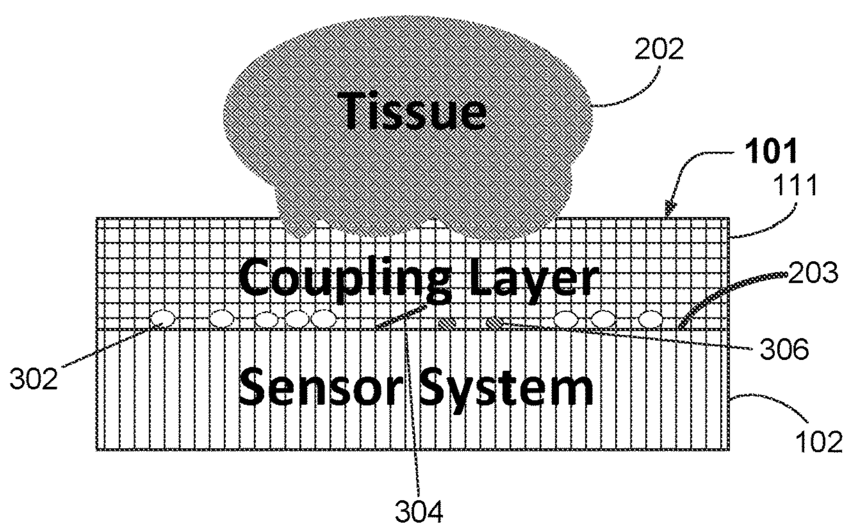
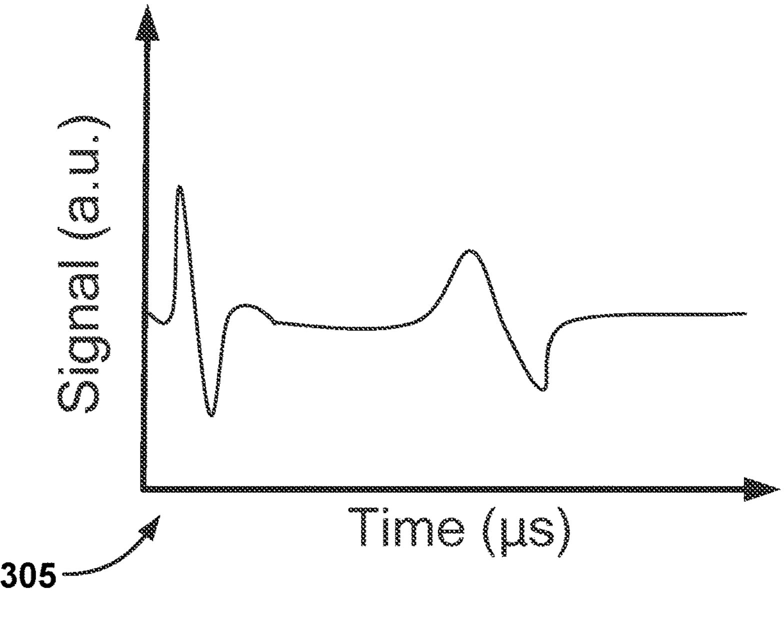
*Figure 3B*

SENSOR-BASED ULTRASONIC COUPLING LAYER EVALUATION AND RELATED USER INTERFACE FUNCTIONALITY

TECHNICAL FIELD

This disclosure relates generally to biometric sensor devices and related methods, including but not limited to ultrasonic and photoacoustic sensor systems and methods for using such systems.

DESCRIPTION OF THE RELATED TECHNOLOGY

A variety of different sensing technologies and algorithms are being implemented in devices for various biometric and biomedical applications, including health and wellness monitoring. This push is partly a result of the limitations in the usability of traditional measuring devices for continuous, noninvasive and ambulatory monitoring. Some such devices include photoacoustic sensor systems, ultrasonic sensor systems, or combinations thereof. Although some previously-deployed devices and systems can provide acceptable results, improved devices and systems would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic receiver system, a user interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to receive ultrasonic sensor data from the ultrasonic receiver system and to detect, based at least in part on the ultrasonic sensor data, one or more imperfections in, on or proximate an adhesive ultrasonic coupling layer on an outer surface of the apparatus. In some examples, the control system may be configured to control the user interface system to provide a prompt to adjust or replace the adhesive ultrasonic coupling layer responsive to detecting the one or more imperfections in, on or proximate the adhesive ultrasonic coupling layer.

In some implementations, the user interface system may include a display and the control system may be configured to control the display to provide at least part of the prompt. In some examples, the control system may be configured to detect one or more air bubbles or contaminants between the adhesive ultrasonic coupling layer and the outer surface of the apparatus. According to some examples, the control system may be configured to detect one or more instances of damage to the adhesive ultrasonic coupling layer.

According to some examples, the control system may be configured to control the ultrasonic receiver to receive ultrasonic waves using a range gate delay and a range gate window that correspond with ultrasonic waves from the adhesive ultrasonic coupling layer. In some such examples, the control system may be configured to detect the one or more imperfections according to the ultrasonic waves.

Other innovative aspects of the subject matter described in this disclosure may be implemented in a method of controlling an apparatus that includes an ultrasonic receiver system. In some examples, the method may involve receiving, by a control system, ultrasonic sensor data from the ultrasonic receiver system and detecting, by the control system and based at least in part on the ultrasonic sensor data, one or more imperfections in, on or proximate an adhesive ultrasonic coupling layer on an outer surface of the apparatus. In some such examples, the method may involve controlling, by the control system, a user interface system to provide a prompt to adjust or replace the adhesive ultrasonic coupling layer responsive to detecting the one or more imperfections in, on or proximate the adhesive ultrasonic coupling layer.

In some examples, the user interface system may include a display. In some such examples, the method may involve controlling the display to provide at least part of the prompt.

According to some examples, the method may involve detecting one or more air bubbles or contaminants between the adhesive ultrasonic coupling layer and the outer surface of the apparatus. Alternatively, or additionally, in some examples the method may involve detecting one or more instances of damage to the adhesive ultrasonic coupling layer.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method of controlling an apparatus that includes an ultrasonic receiver system. According to some examples, the method may involve receiving, by a control system, ultrasonic sensor data from the ultrasonic receiver system and detecting, by the control system and based at least in part on the ultrasonic sensor data, one or more imperfections in, on or proximate an adhesive ultrasonic coupling layer on an outer surface of the apparatus. In some such examples, the method may involve controlling, by the control system, a user interface system to provide a prompt to adjust or replace the adhesive ultrasonic coupling layer responsive to detecting the one or more imperfections in, on or proximate the adhesive ultrasonic coupling layer.

In some examples, the user interface system may include a display. In some such examples, the method may involve controlling the display to provide at least part of the prompt.

According to some examples, the method may involve detecting one or more air bubbles or contaminants between the adhesive ultrasonic coupling layer and the outer surface of the apparatus. Alternatively, or additionally, in some examples the method may involve detecting one or more instances of damage to the adhesive ultrasonic coupling layer.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 2A shows a cross-section through components of an apparatus according to one disclosed example.

FIG. 2B shows a graph that represents ultrasonic sensor data received from an ultrasonic receiver system of the sensor system shown in FIG. 2A.

FIG. 3A shows a cross-section through components of an apparatus according to another disclosed example.

FIG. 3B shows a graph that represents ultrasonic sensor data received from an ultrasonic receiver system of the sensor system shown in FIG. 3A.

DETAILED DESCRIPTION

Figure 1:
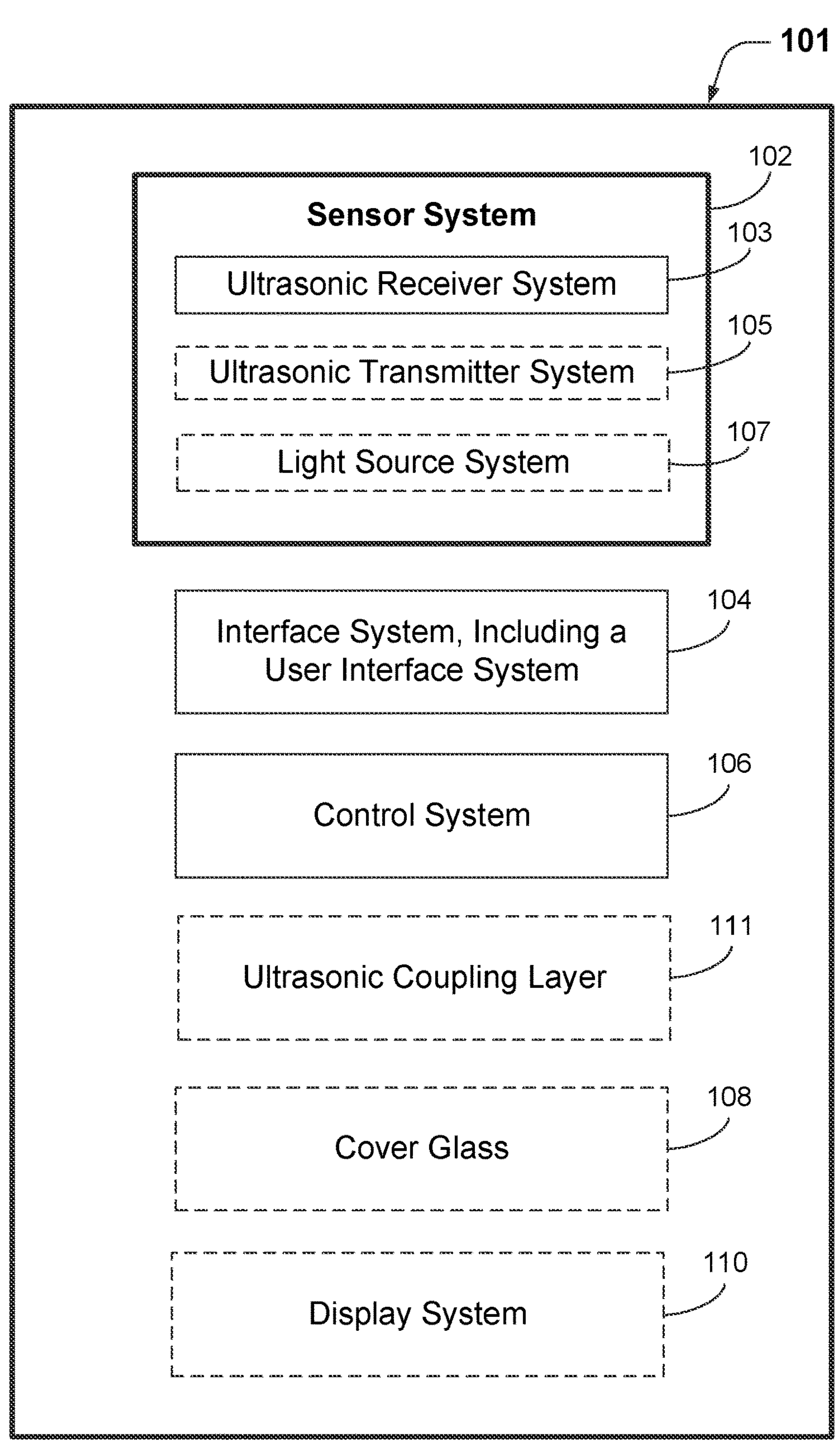
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some existing devices, including but not limited to smart watches, wearable patches, etc., are configured for continuous wellness monitoring in a healthcare wearable. Some such devices include an ultrasonic receiver system. The ultrasonic receiver system may be a component of an ultrasonic sensor system or a component of a photoacoustic sensor system. An ultrasonic coupling layer, such as an adhesive ultrasonic coupling layer, can significantly enhance the transmission of ultrasonic waves between a user's body and the ultrasonic receiver system, or vice versa.

However, it is common for there to be imperfections in, on or proximate an adhesive ultrasonic coupling layer on an outer surface of the apparatus. For example, there may sometimes be air bubbles or contaminants between the adhesive ultrasonic coupling layer and the outer surface of the apparatus. In some instances, the adhesive ultrasonic coupling layer may be torn or otherwise damaged. Sometimes, the adhesive ultrasonic coupling layer may not be properly attached to the outer surface of the apparatus: in addition to possibly including air bubbles due to improper attachment, the adhesive ultrasonic coupling layer may be folded, improperly positioned, etc. Even if the adhesive ultrasonic coupling layer was properly attached to the outer surface of the apparatus at one time, the adhesive ultrasonic coupling layer may become damaged or improperly attached over time. Damage, improper attachment, contaminants and air bubbles can all degrade the adhesive ultrasonic coupling layer's effectiveness and therefore can degrade the performance of the associated ultrasonic and/or photoacoustic sensor system.

Some disclosed methods involve receiving, by a control system, ultrasonic sensor data from the ultrasonic receiver system and detecting, based at least in part on the ultrasonic sensor data, one or more imperfections in, on or proximate an adhesive ultrasonic coupling layer on an outer surface of the apparatus. Some such methods involve controlling a user interface system to provide a prompt to adjust or replace the adhesive ultrasonic coupling layer responsive to detecting the one or more imperfections in, on or proximate the adhesive ultrasonic coupling layer. Some disclosed methods involve determining, based at least in part on the ultrasonic sensor data, whether the adhesive ultrasonic coupling layer is properly attached to the outer surface of the apparatus. Some such methods involve controlling the user interface system to provide a prompt to adjust or replace the adhesive ultrasonic coupling layer responsive to determining that the adhesive ultrasonic coupling layer is not properly attached to the outer surface of the apparatus.

Particular implementations of the subject matter described in this disclosure may be implemented to realize one or more of the following potential advantages. Determining that an adhesive ultrasonic coupling layer is not properly attached and prompting a user to adjust or replace the adhesive ultrasonic coupling layer can substantially enhance ultrasonic coupling and thereby improve the performance of an ultrasonic sensor system or a photoacoustic sensor system. Likewise, detecting one or more imperfections in, on or proximate the adhesive ultrasonic coupling layer and prompting the user to adjust or replace the adhesive ultrasonic coupling layer can substantially enhance ultrasonic coupling and thereby improve the performance of the ultrasonic sensor system or the photoacoustic sensor system.

FIG. 1 is a block diagram that shows example components of an apparatus according to some disclosed implementations. In this example, the apparatus 101 includes a sensor system 102, an interface system, including a user interface system 104 and a control system 106. In some implementations, the apparatus 101 may include an ultrasonic transmitter system 103, a light source system 107, a cover glass 108, a display system 110, an ultrasonic coupling layer 111, or combinations thereof.

According to this example, the sensor system 102 includes an ultrasonic receiver system 103. In some examples, as suggested by the dashed lines within the sensor system 102, the sensor system 102 may include an ultrasonic receiver system 103 and a separate ultrasonic transmitter system 105. In some such examples, the ultrasonic transmitter system 105 may include an ultrasonic plane-wave generator.

However, various examples of ultrasonic sensors are disclosed herein, some of which may include a separate ultrasonic transmitter system 105 and some of which may not. Although shown as separate elements in FIG. 1, in some implementations the ultrasonic receiver system 103 and the ultrasonic transmitter system 105 may be combined in an ultrasonic transceiver system. For example, in some implementations, the sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

In some examples, the sensor system 102 may be, or may include, a photoacoustic sensor system. In such examples, the sensor system 102 may include a light source system 107 configured for providing light to a target object-such as a portion of a user's body-on an outer surface of the apparatus 101. The light source system 107 may, for example, include one or more laser diodes and a drive circuit. The drive circuit may be considered to be part of the control system 106. In some examples, the light source system 107 may include one or more light-emitting diodes, one or more vertical cavity surface-emitting lasers, one or more edge emitting lasers, or combinations thereof. According to some examples, the drive circuit may be configured to cause the light source system 107 to emit pulses of light at pulse widths in a range from 3 nanoseconds to 1000 nanoseconds. In some examples, the drive circuit may be configured to cause the light source system 107 to emit pulses of light at pulse repetition frequencies in a range from 1 kilohertz to 100 kilohertz. The ultrasonic receiver system 103 may be configured to receive ultrasonic waves photoacoustically generated by the target object, responsive to the light from the light source system 107.

Data received from the sensor system 102 may sometimes be referred to herein as "ultrasonic image data," "image data," etc., although the data will generally be received from the ultrasonic sensor system in the form of electrical signals. Accordingly, without additional processing such image data would not necessarily be perceivable by a human being as an image.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include one or more dedicated components for controlling the sensor system 102. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be configured for receiving and processing data from the sensor system 102. If the apparatus 101 includes a separate ultrasonic transmitter system 105, the control system 106 may be configured for controlling the ultrasonic transmitter system 105. If the apparatus 101 includes a separate light source system 107, the control system 106 may be configured for controlling the light source system 107. In some implementations, functionality of the control system 106 may be partitioned between one or more controllers or processors, such as between a dedicated sensor controller and an applications processor of a mobile device.

In this implementation, the interface system 104 includes a user interface system. The user interface system may, for example, include a microphone system, a loudspeaker system, a touch sensor system, a gesture sensor system, a camera system, etc. Although the display system 110 is shown separately in FIG. 1, the user interface system may include a display system.

In some examples, the interface system 104 may include a wireless interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the sensor system 102. According to some such examples, the interface system 104 may couple at least a portion of the control system 106 to the sensor system 102, e.g., via electrically conducting material (e.g., via conductive metal wires or traces. If the apparatus 101 includes an ultrasonic transmitter system 105 that is separate from the ultrasonic receiver system 103, the interface system 104 may be configured to provide communication between at least a portion of the control system 106 and the ultrasonic transmitter system 105. According to some examples, the interface system 104 may be configured to provide communication between the apparatus 101 and other devices. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

According to some examples, the apparatus 101 may include a cover glass 108. The cover glass may or may not actually be made of glass, depending on the particular implementation. The cover glass 108 may be formed of any appropriate material, such as glass, a hard plastic, etc. If the cover glass 108 overlies a display, the cover glass 108 is preferably formed of transparent material.

In some implementations, the apparatus 101 may include a display system 110. For example, the apparatus 101 may include layers of one or more displays, which layers may be referred to herein as a "display stack." In some examples, the display system 110 may be, or may include, a light-emitting diode (LED) display, such as an organic light-emitting diode (OLED) display.

In some examples, the apparatus 101 may include an ultrasonic coupling layer 111. According to some examples, the ultrasonic coupling layer 111 may be, or may include, a crosslinked hydrogel, such as Aqua-Gel™ or Hydrofilm™, a thermoplastic polymer such as Aqualink™ 100 or Aqualink™ 200, a pressure-sensitive adhesive (PSA), polyethylene terephthalate (PET), polyurethane, one or more combinations of PSA, PET and/or polyurethane, etc. In some instances, even if the ultrasonic coupling layer 111 is attached to the apparatus 101, the ultrasonic coupling layer 111 may be regarded as a separate or separable component that is not necessarily part of the apparatus 101. Accordingly, the ultrasonic coupling layer 111 may, in some instances, be described herein as being attached to an outer surface of the apparatus 101.

The apparatus 101 may be used in a variety of different contexts, some examples of which are disclosed herein. In some implementations, a wearable device may include at least a portion of the apparatus 101. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone), one or more servers, etc. The interface system 104 also may, in some such examples, reside in more than one device.

FIG. 2A shows a cross-section through components of an apparatus according to one disclosed example. In this example, the apparatus 101 shown in FIG. 2A is an instance of the apparatus 101 of FIG. 1. As with other disclosed implementations, the types, number and arrangement of elements shown in FIG. 2A, as well as the dimensions of elements, are merely examples. According to this implementation, the apparatus 101 includes an ultrasonic coupling layer 111 that is configured to couple a portion of a human body—represented by the portion of the tissue 202 that is in contact with the ultrasonic coupling layer 111—to a sensor system 102.

According to this example, the apparatus 101 is configured to perform at least some of the methods disclosed herein. For example, the apparatus 101 is configured for receiving, by a control system (not shown), ultrasonic sensor data from an ultrasonic receiver system of the sensor system 102. The ultrasonic sensor data may, in some examples, correspond with reflections of ultrasonic waves that were transmitted by the sensor system 102. According to some examples, the ultrasonic sensor data may correspond with ultrasonic waves that were generated responsive to light transmitted by the sensor system 102. Accordingly, the sensor system 102 may be, or may include, an ultrasonic sensor system or a photoacoustic sensor system. In this example, the apparatus 101 is configured to determine, based at least in part on the ultrasonic sensor data, whether the adhesive ultrasonic coupling layer is properly attached to the outer surface 203 of the sensor system 102. The outer surface 203 may, in some instances, be regarded as the outer surface of the apparatus 101 prior to the application of the ultrasonic coupling layer 111.

FIG. 2B shows a graph that represents ultrasonic sensor data received from an ultrasonic receiver system of the sensor system shown in FIG. 2A. According to this example, the graph 205 shows the amplitude of the ultrasonic sensor data on the vertical axis, in arbitrary units (a.u.), and represents time in microseconds on the horizontal axis. In this example, the ultrasonic sensor data indicates that the adhesive ultrasonic coupling layer 111 is properly attached to the outer surface of the apparatus.

In some examples, the control system may determine whether the adhesive ultrasonic coupling layer 111 is properly attached to the outer surface 203 of the sensor system 102 by detecting, based at least in part on the ultrasonic sensor data, one or more imperfections in, on or proximate the adhesive ultrasonic coupling layer 111. The one or more imperfections may include one or more air bubbles or contaminants between the adhesive ultrasonic coupling layer 111 and the outer surface 203. In some examples, the control system may determine whether the adhesive ultrasonic coupling layer 111 is properly attached to the outer surface 203 by detecting, based at least in part on the ultrasonic sensor data, one or more folds in the adhesive ultrasonic coupling layer 111. According to some examples, the control system may determine whether the adhesive ultrasonic coupling layer 111 is properly attached to the outer surface 203 by determining that the number of imperfections, folds, etc., is less than a threshold number, by determining that the number of imperfections, folds, etc., covers less than a threshold area of the adhesive ultrasonic coupling layer 111 or the outer surface 203, etc.

According to some examples, the control system may be configured for detecting the one or more imperfections, one or more folds, etc., by isolating ultrasonic image data obtained from the interface between the adhesive ultrasonic coupling layer 111 and the outer surface 203 from other ultrasonic image data obtained by the sensor system 102. In some such examples, the control system may be configured for isolating this ultrasonic image data according to a range gate delay (RGD) and a range gate window (RGW) corresponding with the interface between the adhesive ultrasonic coupling layer 111 and the outer surface 203. Some examples are described herein with reference to FIGS. 4 and 5.

In some examples, the control system may determine whether the adhesive ultrasonic coupling layer 111 is properly attached to the outer surface 203 by comparing currently-obtained ultrasonic image data obtained from the adhesive ultrasonic coupling layer 111, obtain from the interface between the adhesive ultrasonic coupling layer 111 and the outer surface 203, or both, with previously-obtained ultrasonic image data obtained from the adhesive ultrasonic coupling layer 111, obtain from the interface between the adhesive ultrasonic coupling layer 111 and the outer surface 203, or both. The previously-obtained ultrasonic image data may, for example, have been obtained during a factory calibration process during which it was verified that the adhesive ultrasonic coupling layer 111 was properly attached to the outer surface 203.

According to some examples, the control system may be configured to implement a neural network that has been trained to determine whether the adhesive ultrasonic coupling layer 111 is properly attached to the outer surface 203. The neural network may, for example, have been trained using "ground truth" ultrasonic image data that was obtained during a factory calibration process during which it was verified that the adhesive ultrasonic coupling layer 111 was properly attached to the outer surface 203.

In some examples, the control system may determine whether the adhesive ultrasonic coupling layer 111 is properly attached to the outer surface 203 by detecting, based at least in part on the ultrasonic sensor data, an area of the outer surface 203 that is covered by the adhesive ultrasonic coupling layer 111 and by comparing the area of the outer surface 203 that is covered with an area that should be covered. Alternatively, or additionally, the control system may determine whether the adhesive ultrasonic coupling layer 111 is properly attached to the outer surface 203 by detecting, based at least in part on the ultrasonic sensor data, whether the position of the adhesive ultrasonic coupling layer 111 is rotated or translated with respect to the position in which the adhesive ultrasonic coupling layer 111 should be positioned.

Figure 2C:
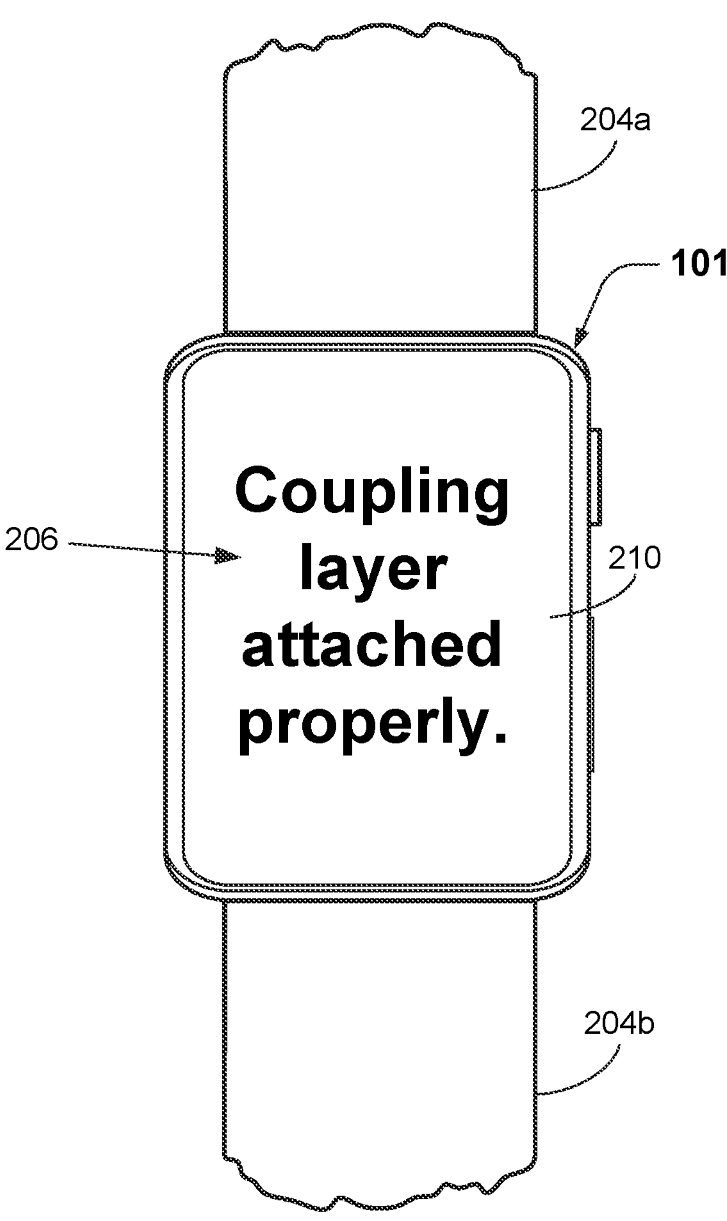
FIG. 2C shows an example of an apparatus providing a user prompt indicating that an adhesive ultrasonic coupling layer is properly attached.

FIG. 2C shows an example of an apparatus providing a user prompt indicating that an adhesive ultrasonic coupling layer is properly attached. According to this example, the apparatus 101 is a smart watch that is configured for noninvasive wellness monitoring using a sensor system 102. In some examples, the sensor system 102 may include a photoacoustic sensor system, an ultrasonic sensor systems, or a combination thereof. As with other disclosed implementations, the types, number and arrangement of elements shown in FIG. 2C, as well as the dimensions of elements, are merely examples.

In this example, the apparatus 101 shown in FIG. 2C is an instance of the apparatus 101 of FIGS. 1 and 2A. According to this example, the display 210 is facing "upwards," towards the viewer, on a first side of the apparatus 101. In this example, the sensor system 102 and the ultrasonic coupling layer 111 are on a second and opposite side of the apparatus 101. In some instance, the second and opposite side of the apparatus 101 may be in contact with the wrist tissue of a person wearing the apparatus 101. Watch strap portions 204*a* and 204*b* may be configured to attach the apparatus 101 to a person's wrist and to secure the ultrasonic coupling layer 111 to the person's wrist tissue.

According to this example, a control system (not shown) of the apparatus 101 has determined that ultrasonic sensor data received from the sensor system 102 indicates that the adhesive ultrasonic coupling layer 111 is properly attached to the outer surface 203 of the sensor system 102. Responsive to determining that the adhesive ultrasonic coupling layer 111 is properly attached, the control system is configured to provide one or more user prompts indicating that the adhesive ultrasonic coupling layer 111 is properly attached. In this example, the control system is configured to control the display 210—which is a component of the display system 110 of FIG. 1—to provide the visual prompt 206 indicating that the adhesive ultrasonic coupling layer 111 is properly attached. In some examples, the control system may be configured to control one or more loudspeakers of the apparatus 101 to provide a corresponding audio prompt, configured to control a haptic feedback system of the apparatus 101 to provide corresponding haptic feedback, etc.

FIG. 3A shows a cross-section through components of an apparatus according to another disclosed example. In this example, the apparatus 101 shown in FIG. 3A is an instance of the apparatus 101 of FIG. 1. As with other disclosed implementations, the types, number and arrangement of elements shown in FIG. 3A, as well as the dimensions of elements, are merely examples.

As in the example shown in FIG. 2A, in this example the apparatus 101 includes an ultrasonic coupling layer 111 that is configured to couple a portion of a human body—represented by the tissue 202—to a sensor system 102. However, unlike the example shown in FIG. 2A, in this example there are air bubbles 302 and contaminants—in this example, the dirt particles 306—between the adhesive ultrasonic coupling layer 111 and the outer surface 203. In addition, there is at least one tear 304 in the adhesive ultrasonic coupling layer 111.

In this example, a control system (not shown) of the apparatus 101 is configured to detect, based at least in part on ultrasonic sensor data from the sensor system 102, one or more imperfections in, on or proximate the adhesive ultrasonic coupling layer 111 on the outer surface 203 of the sensor system 102. Accordingly, the control system is configured to detect the air bubbles 302, the dirt particles 306 and the tear 304.

As noted elsewhere herein, according to some disclosed examples the control system may be configured for detecting the one or more imperfections, one or more folds, etc., by isolating ultrasonic image data obtained from the interface between the adhesive ultrasonic coupling layer 111 and the outer surface 203 from other ultrasonic image data obtained by the sensor system 102. In some such examples, the control system may be configured for isolating this ultrasonic image data according to an RGD and an RGW corresponding with the interface between the adhesive ultrasonic coupling layer 111 and the outer surface 203. Some examples are described herein with reference to FIGS. 4 and 5.

In some instances, air bubbles 302 between the adhesive ultrasonic coupling layer 111 and the outer surface 203 may be detected because of the high acoustic impedance contrast between the air bubbles 302 and the outer surface 203, because of the high acoustic impedance contrast between the air bubbles 302 and the adhesive ultrasonic coupling layer 111, or both. Similarly, dirt particles 306 between the adhesive ultrasonic coupling layer 111 and the outer surface 203 may be detected because of change in acoustic impedance contrast between the dirt particle 306/outer surface 203 interface and the adhesive ultrasonic coupling layer 111/outer surface 203 interface. In some examples, rips and tears 304, folds, etc., in the adhesive ultrasonic coupling layer 111 may cause ultrasonic wave diffraction or other ultrasonic image data artifacts and may be detected accordingly.

FIG. 3B shows a graph that represents ultrasonic sensor data received from an ultrasonic receiver system of the sensor system shown in FIG. 3A. As in the example shown in FIG. 2B, the graph 305 shows the amplitude of the ultrasonic sensor data on the vertical axis and represents time on the horizontal axis. In this example, the ultrasonic sensor data indicates that the adhesive ultrasonic coupling layer 111 is not properly attached to the outer surface of the apparatus. One may observe that the ultrasonic sensor data of graph 305 does not match the ultrasonic sensor data of graph 205. Although this is a simplified representation shown to provide a visual example, just as the ultrasonic sensor data represented in graph 205 differs from the ultrasonic sensor data represented in graph 305, a control system can be configured to detect changes or differences in received ultrasonic waves that are caused by imperfections in, on or proximate the adhesive ultrasonic coupling layer 111. Moreover, a control system can be configured to detect, based at least in part on received ultrasonic waves, whether or not the adhesive ultrasonic coupling layer 111 is properly attached to the surface 203.

Figure 3C:
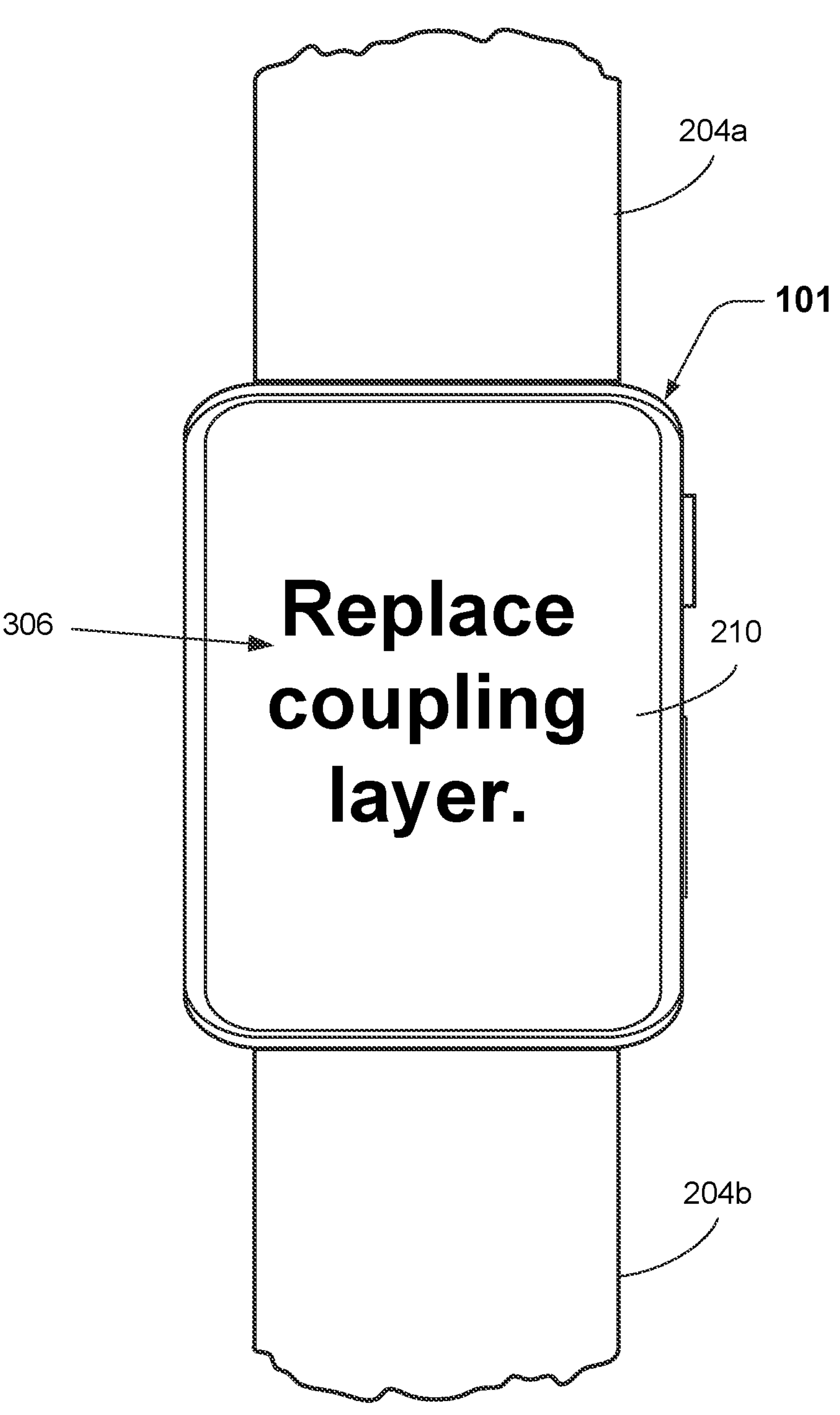
FIG. 3C shows an example of an apparatus providing a user prompt indicating that an adhesive ultrasonic coupling layer needs to be replaced.

FIG. 3C shows an example of an apparatus providing a user prompt indicating that an adhesive ultrasonic coupling layer needs to be replaced. According to this example, the apparatus 101 is the same smart watch that is shown in FIG. 2A, except for the imperfections in and proximate the adhesive ultrasonic coupling layer 111.

According to this example, a control system (not shown) of the apparatus 101 has determined that ultrasonic sensor data received from the sensor system 102 indicates that the adhesive ultrasonic coupling layer 111 needs to be replaced. Responsive to determining that the adhesive ultrasonic coupling layer 111 needs to be replaced, the control system is configured to provide one or more user prompts indicating that the adhesive ultrasonic coupling layer 111 needs to be replaced. In this example, the control system is configured to control the display 210 to provide the visual prompt 306 indicating that the adhesive ultrasonic coupling layer 111 needs to be replaced. In some examples, the control system may be configured to control one or more loudspeakers of the apparatus 101 to provide a corresponding audio prompt, configured to control a haptic feedback system of the apparatus 101 to provide corresponding haptic feedback, etc.

Figure 4:
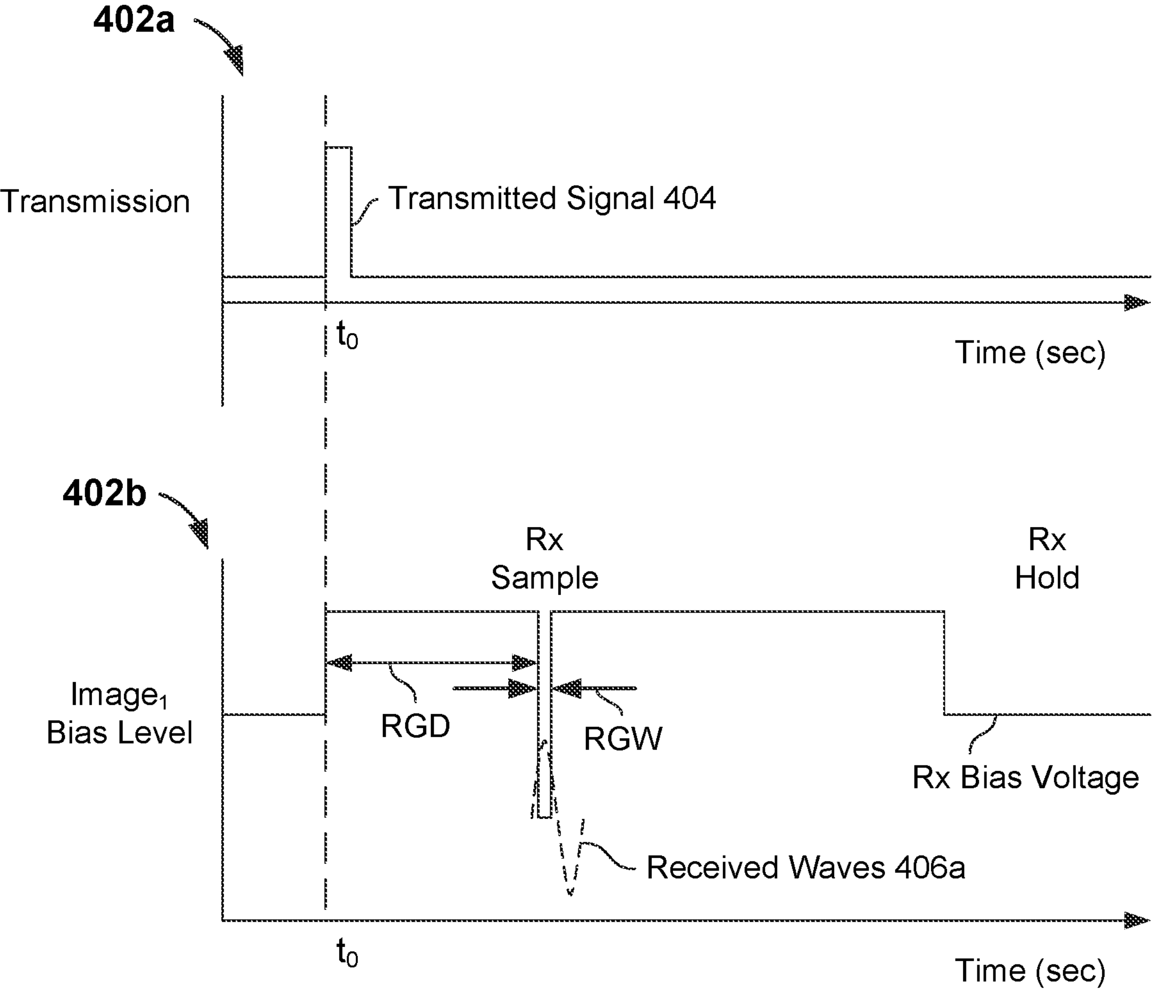
FIG. 4 shows examples of acquisition time delays and acquisition time windows according to some implementations.

FIG. 4 shows examples of acquisition time delays and acquisition time windows according to some implementations. Acquisition time delays may sometimes be referred to herein as range gate delays or RGDs. Acquisition time windows may sometimes be referred to herein as range gate windows or RGWs. These examples of RGDs and RGWs may, for example, be suitable for acquiring ultrasonic image data corresponding to the adhesive ultrasonic coupling layer 111/outer surface 203 interface.

FIG. 4 provides an example of what may be referred to herein as "DBIAS sampling," in which the receiver bias voltage level changes when a signal is sampled. In this example, the receiver bias voltage level also changes when a signal is transmitted. In FIG. 4, an acquisition time delay is labeled as "RGD," an acronym for "range-gate delay," and an acquisition time window is labeled as "RGW," an acronym for "range-gate window." Graph 402*a* shows a transmitted signal 404 that is initiated at a time to. The transmitted signal 404 may, for example, be a pulse of ultrasound emitted by an ultrasonic transmitter or transceiver of an ultrasonic sensor system or a pulse of light emitted by a light source of a photoacoustic sensor system. In alternative examples, multiple pulses of ultrasound or light may be transmitted.

Graph 402*b* shows examples of an acquisition time delay RGD and an acquisition time window RGW. The received waves 406*a* represent reflected ultrasonic waves—or photoacoustically-generated ultrasonic waves—that are received by an ultrasonic sensor array and sampled during the acquisition time window RGW, after the acquisition time delay RGD. In some examples, the acquisition time delay may be in the range of about 10 nanoseconds to about 20,000 nanoseconds or more. In some implementations, the acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be more than 50 nanoseconds.

According to some examples, an acquisition time delay or RGD may correspond to an expected amount of time for an ultrasonic wave reflected from the adhesive ultrasonic coupling layer 111/outer surface 203 interface to be received by at least a portion of the ultrasonic receiver system 103 (e.g., by an array of sensor pixels). In some examples, an RGD may correspond to an expected amount of time for a photoacoustically-generated ultrasonic wave from the adhesive ultrasonic coupling layer 111/outer surface 203 interface to be received by at least a portion of the ultrasonic receiver system 103. In some examples, the acquisition time window or RGW may correspond to an expected amount of time for reflected or photoacoustically-generated ultrasonic waves to traverse at least a portion of the ultrasonic coupling layer 111, such that the received ultrasonic waves correspond to the adhesive ultrasonic coupling layer 111/outer surface 203 interface and to at least a portion of the ultrasonic coupling layer 111. Such examples may be appropriate for detecting air bubbles 302, dirt particles 306, etc., between the adhesive ultrasonic coupling layer 111 and the outer surface 203 (see FIG. 3A), as well as for detecting rips and tears 304, etc., in the adhesive ultrasonic coupling layer 111.

According to some examples, the acquisition time delay or RGD may correspond to an expected amount of time for ultrasonic waves reflected from at least a portion of the tissue 202 in contact with the ultrasonic coupling layer 111—or ultrasonic waves photoacoustically generated by at least a portion of the tissue 202—to be received by at least a portion of the ultrasonic receiver system 103 (e.g., by an array of sensor pixels), such that the received ultrasonic waves correspond to at least a portion of the tissue 202. In addition to being potentially useful for estimating biometric features such as heart rate, blood pressure, etc., the corresponding ultrasonic image data also may be useful for detecting defects in the adhesive ultrasonic coupling layer 111, contaminants proximate the adhesive ultrasonic coupling layer 111, etc. Such defects, contaminants, etc., may appear as anomalous reflections in the ultrasonic image data. In some examples, a user may be prompted to move the apparatus 101 relative to the tissue 202, or vice versa, in order to determine whether such anomalous reflections are caused by the tissue or by defects, contaminants, etc., in or proximate the adhesive ultrasonic coupling layer 111.

Figure 5:
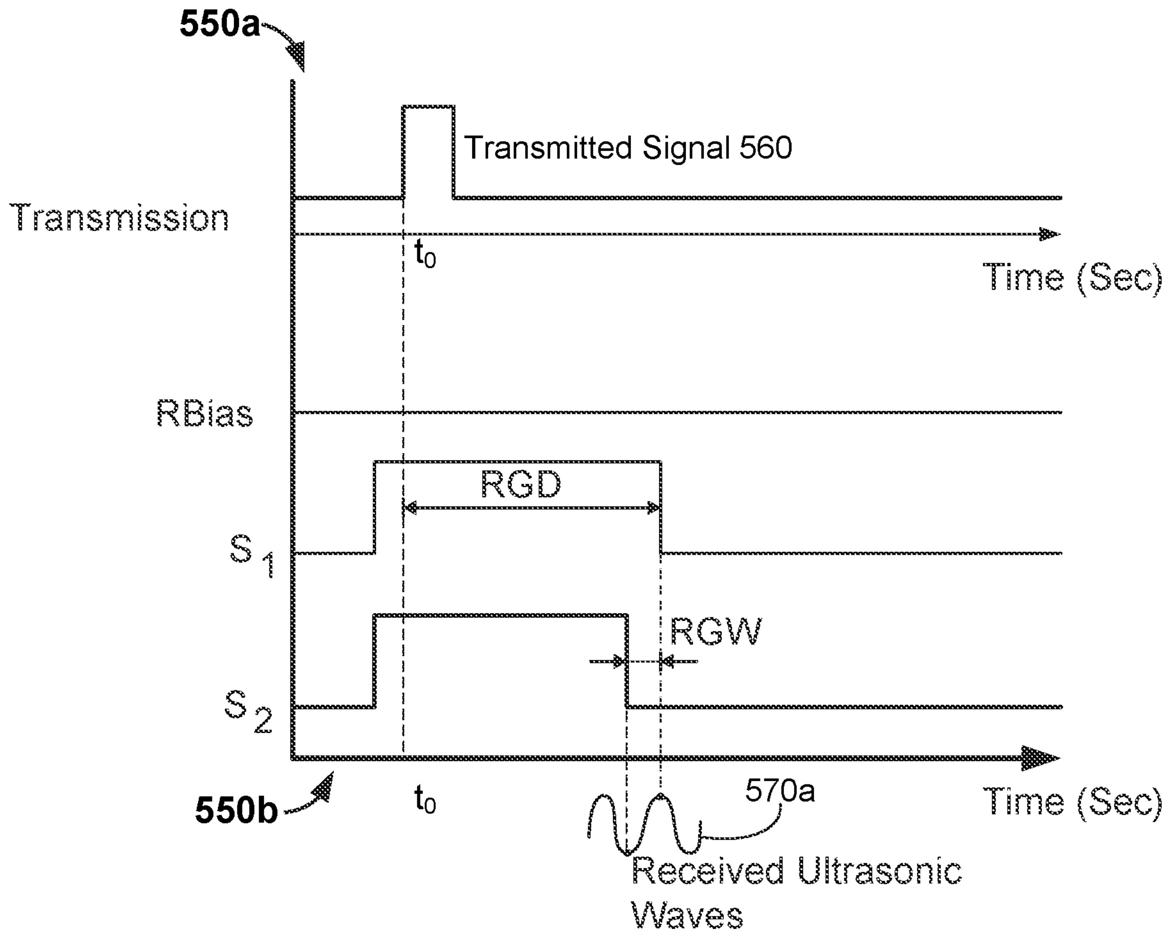
FIG. 5 shows examples of an acquisition time delays and an acquisition time window according to some implementations of peak-to-peak sampling.

FIG. 5 shows examples of an acquisition time delays and an acquisition time window according to some implementations of peak-to-peak sampling. Graph 550*a* shows a transmitted signal 560 that is initiated at a time to. The transmitted signal 560 may, for example, be a pulse of ultrasound emitted by an ultrasonic transmitter or transceiver of an ultrasonic sensor system or a pulse of light emitted by a light source of a photoacoustic sensor system. In alternative examples, multiple pulses of ultrasound or light may be transmitted.

Graph 550*b* shows examples of an acquisition time delay RGD and an acquisition time window RGW. The received waves 570*a* represent reflected ultrasonic waves that are received by an ultrasonic sensor array and sampled during first acquisition time window RGW, after the acquisition time delay RGD. In some examples, the acquisition time delay may be in the range of about 10 nanoseconds to about 20,000 nanoseconds or more. In some implementations, the acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the acquisition time window may be more than 50 nanoseconds.

Figure 6:
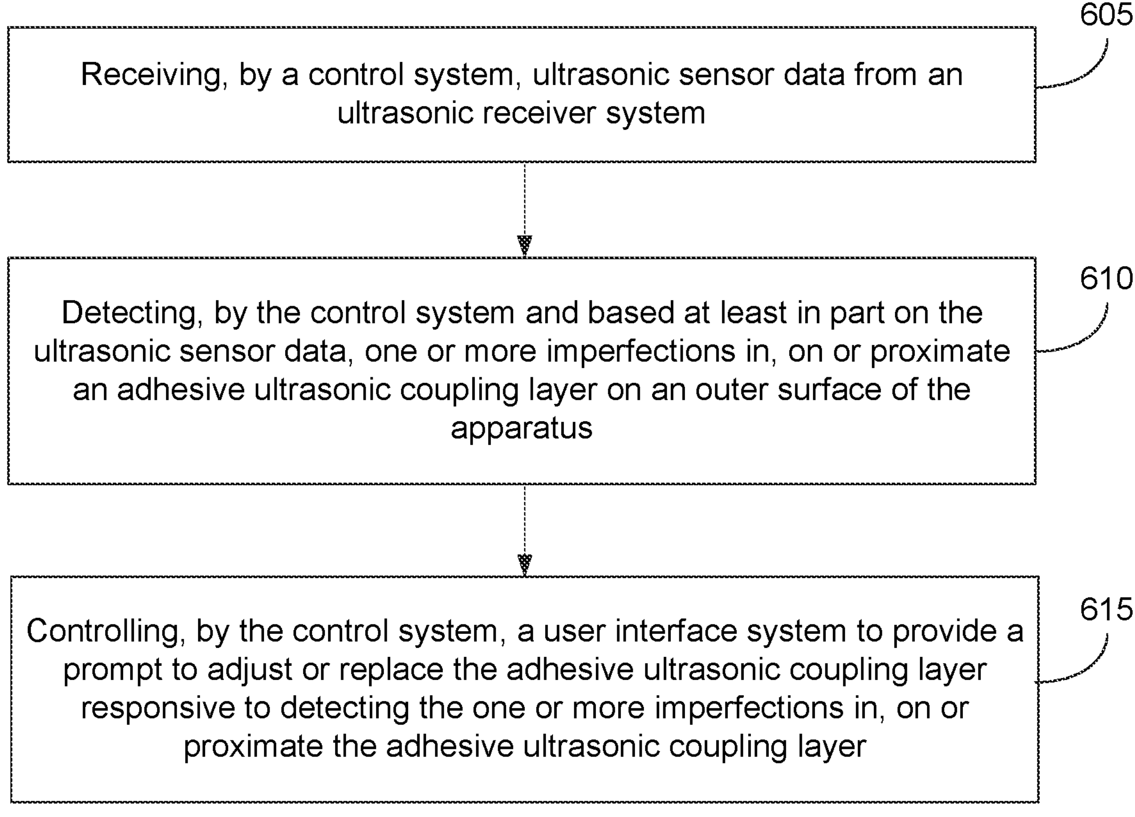
FIG. 6 is a flow diagram that provides examples of operations according to some disclosed methods.

FIG. 6 is a flow diagram that provides examples of operations according to some disclosed methods. The blocks of FIG. 6 may, for example, be performed by the apparatus 101 of FIG. 1 or 2, or by a similar apparatus. As with other methods disclosed herein, the method outlined in FIG. 6 may include more or fewer blocks than indicated. Moreover, the blocks of methods disclosed herein are not necessarily performed in the order indicated. In some instances, one or more blocks may be performed concurrently.

In this example, block 605 involves receiving, by a control system, ultrasonic sensor data from an ultrasonic receiver system. For example, block 605 may involve the control system 106 of FIG. 1 controlling the sensor system 102 to acquire ultrasonic sensor data according to an ultrasonic-based process or a photoacoustic-based process. In some examples, the ultrasonic sensor data may be obtained by applying an RGD and an RGW according to one of the examples disclosed herein. Some such examples may involve controlling the ultrasonic receiver system to receive ultrasonic waves using an RGD and an RGW that correspond with at least a portion of the adhesive ultrasonic coupling layer 111, controlling the ultrasonic receiver system to receive ultrasonic waves using an RGD and an RGW that correspond with an interface between the adhesive ultrasonic coupling layer 111 and the outer surface 203 shown in FIG. 3A, etc.

According to this example, block 610 involves detecting, by the control system and based at least in part on the ultrasonic sensor data, one or more imperfections in, on or proximate an adhesive ultrasonic coupling layer on an outer surface of the apparatus. For example, block 610 may involve detecting one or more air bubbles or contaminants (such as dirt, oil, etc.) between the adhesive ultrasonic coupling layer and the outer surface of the apparatus. In some examples, block 610 may involve detecting one or more instances of damage to the adhesive ultrasonic coupling layer, such as one or more rips or tears. In some examples, block 610 may involve detecting the one or more imperfections according to ultrasonic sensor data corresponding to ultrasonic waves obtained using one of the RGD and RGW examples disclosed herein.

In this example, block 615 involves controlling, by the control system, a user interface system to provide a prompt to adjust or replace the adhesive ultrasonic coupling layer responsive to detecting the one or more imperfections in, on or proximate the adhesive ultrasonic coupling layer. In some implementations the apparatus 101 may include a display. According to some such examples, block 615 may involve controlling the display to provide at least part of the prompt. In some instances, block 615 may involve controlling one or more loudspeakers, a haptic feedback system, or both, to provide at least part of the prompt.

In some examples, method 600 may involve determining, based at least in part on the ultrasonic sensor data, whether the adhesive ultrasonic coupling layer is properly attached to the outer surface of the apparatus. According to some such examples, method 600 may involve controlling the user interface system to provide a prompt to adjust or replace the adhesive ultrasonic coupling layer responsive to determining that the adhesive ultrasonic coupling layer is not properly attached to the outer surface of the apparatus.

According to some examples, method 600 may involve receiving, via the ultrasonic receiver system, first ultrasonic sensor data from a target object when the apparatus is in a first position relative to the target object. In some such examples, method 600 may involve controlling the user interface system to provide a prompt to rotate or translate the apparatus to a second position relative to the target object. For example, if the apparatus is a smart watch, method 600 may involve controlling the user interface system to provide a prompt to rotate or translate the watch relative to the user's wrist. In some such examples, method 600 may involve receiving, via the ultrasonic receiver system, second ultrasonic sensor data from the target object when the apparatus is in the second position and determining, based at least in part on one or more differences between the first ultrasonic sensor data and the second ultrasonic sensor data, whether there are one or more imperfections in, on or proximate the adhesive ultrasonic coupling layer. For example, if there are anomalous reflections detected in the first and second ultrasonic sensor data that remain in the same position relative to the apparatus, these may be caused by imperfections in, on or proximate the adhesive ultrasonic coupling layer. In some alternative examples, a similar technique may involve prompting the user to rotate and/or translate a finger or a test pattern relative to the apparatus, or vice versa.

Implementation examples are described in the following numbered clauses:

1. An apparatus, including: an ultrasonic receiver system; a user interface system; and a control system configured to: receive ultrasonic sensor data from the ultrasonic receiver system; detect, based at least in part on the ultrasonic sensor data, one or more imperfections in, on or proximate an adhesive ultrasonic coupling layer on an outer surface of the apparatus; and control the user interface system to provide a prompt to adjust or replace the adhesive ultrasonic coupling layer responsive to detecting the one or more imperfections in, on or proximate the adhesive ultrasonic coupling layer.
2. The apparatus of clause 1, where the user interface system includes a display and where the control system is configured to control the display to provide at least part of the prompt.
3. The apparatus of clause 1 or clause 2, where the control system is configured to detect one or more air bubbles or contaminants between the adhesive ultrasonic coupling layer and the outer surface of the apparatus.
4. The apparatus of any one of clauses 1-3, where the control system is configured to detect one or more instances of damage to the adhesive ultrasonic coupling layer.
5. The apparatus of any one of clauses 1-4, where the control system is further configured to: control the ultrasonic receiver to receive ultrasonic waves using a range gate delay and a range gate window that correspond with ultrasonic waves from the adhesive ultrasonic coupling layer; and detect the one or more imperfections according to the ultrasonic waves.

6. The apparatus of any one of clauses 1-5, where the control system is further configured to: receive, via the ultrasonic receiver system, first ultrasonic sensor data from a target object when the apparatus is in a first position relative to the target object; control the user interface system to provide a prompt to rotate or translate the apparatus to a second position relative to the target object; receive, via the ultrasonic receiver system, second ultrasonic sensor data from the target object when the apparatus is in the second position; and determine, based at least in part on one or more differences between the first ultrasonic sensor data and the second ultrasonic sensor data, whether there are one or more imperfections in, on or proximate the adhesive ultrasonic coupling layer.

7. The apparatus of clause 6, where the target object is a wrist, a digit or a test pattern.

8. The apparatus of any one of clauses 1-7, further including an attachment system configured for attaching the apparatus to a user's body, where the attachment system includes one or more attachment devices.

9. The apparatus of clause 8, where the attachment system includes a strap configured for attaching the apparatus to the user's wrist or upper arm.

10. The apparatus of any one of clauses 1-9, where the control system is further configured to: determine, based at least in part on the ultrasonic sensor data, whether the adhesive ultrasonic coupling layer is properly attached to the outer surface of the apparatus; and control the user interface system to provide a prompt to adjust or replace the adhesive ultrasonic coupling layer responsive to determining that the adhesive ultrasonic coupling layer is not properly attached to the outer surface of the apparatus.

11. The apparatus of any one of clauses 1-10, where the ultrasonic receiver system is a component of an ultrasonic sensor system or a photoacoustic sensor system.

12. A method of controlling an apparatus that includes an ultrasonic receiver system, the method including: receiving, by a control system, ultrasonic sensor data from the ultrasonic receiver system; detecting, by the control system and based at least in part on the ultrasonic sensor data, one or more imperfections in, on or proximate an adhesive ultrasonic coupling layer on an outer surface of the apparatus; and controlling, by the control system, a user interface system to provide a prompt to adjust or replace the adhesive ultrasonic coupling layer responsive to detecting the one or more imperfections in, on or proximate the adhesive ultrasonic coupling layer.

13. The method of clause 12, where the user interface system includes a display and where the method involves controlling the display to provide at least part of the prompt.

14. The method of clause 12 or clause 13, where the method involves detecting one or more air bubbles or contaminants between the adhesive ultrasonic coupling layer and the outer surface of the apparatus.

15. The method of any one of clauses 12-14, where the method involves detecting one or more instances of damage to the adhesive ultrasonic coupling layer.

16. The method of any one of clauses 12-15, where the method involves: controlling the ultrasonic receiver system to receive ultrasonic waves using a range gate delay and a range gate window that correspond with the adhesive ultrasonic coupling layer; and detecting the one or more imperfections according to ultrasonic sensor data corresponding to the ultrasonic waves.

17. An apparatus, including: an ultrasonic receiver system; a user interface system; and control means for: receiving ultrasonic sensor data from the ultrasonic receiver system; determining, based at least in part on the ultrasonic sensor data, whether the adhesive ultrasonic coupling layer is properly attached to the outer surface of the apparatus; and controlling the user interface system to provide a prompt to adjust or replace the adhesive ultrasonic coupling layer responsive to determining that the adhesive ultrasonic coupling layer is not properly attached to the outer surface of the apparatus.

18. The apparatus of clause 17, where the control means includes means for: detecting, based at least in part on the ultrasonic sensor data, one or more imperfections in, on or proximate an adhesive ultrasonic coupling layer on an outer surface of the apparatus; and controlling the user interface system to provide a prompt to adjust or replace the adhesive ultrasonic coupling layer responsive to detecting the one or more imperfections in, on or proximate the adhesive ultrasonic coupling layer.

19. The apparatus of clause 17 or clause 18, where the control means includes means for detecting one or more air bubbles or contaminants between the adhesive ultrasonic coupling layer and the outer surface of the apparatus.

20. The apparatus of any one of clauses 17-19, where the control means includes means for detecting one or more instances of damage to the adhesive ultrasonic coupling layer.

21. The apparatus of any one of clauses 17-20, further including attachment means for attaching the apparatus to a user's body.

22. The apparatus of any one of clauses 17-21, where the ultrasonic receiver system is a component of an ultrasonic sensor system or a photoacoustic sensor system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:

an ultrasonic receiver system;

a user interface system; and a control system configured to:

receive, via the ultrasonic receiver system, first ultrasonic sensor data from a target object when the apparatus is in a first position relative to the target object;

control the user interface system to provide a prompt to rotate or translate the apparatus to a second position relative to the target object;

receive, via the ultrasonic receiver system, second ultrasonic sensor data from the target object when the apparatus is in the second position;

detect, based at least in part on one or more differences between the first ultrasonic sensor data and the second ultrasonic sensor data, whether there are one or more imperfections in, on or proximate an adhesive ultrasonic coupling layer on an outer surface of the apparatus; and control the user interface system to provide a prompt to adjust or replace the adhesive ultrasonic coupling layer responsive to detecting the one or more imperfections in, on or proximate the adhesive ultrasonic coupling layer.

2. The apparatus of claim 1, wherein the user interface system includes a display and wherein the control system is configured to control the display to provide at least part of the prompt.

3. The apparatus of claim 1, wherein the control system is configured to detect one or more air bubbles or contaminants between the adhesive ultrasonic coupling layer and the outer surface of the apparatus.

4. The apparatus of claim 1, wherein the control system is configured to detect one or more instances of damage to the adhesive ultrasonic coupling layer.

5. The apparatus of claim 1, wherein the control system is further configured to:

control the ultrasonic receiver system to receive ultrasonic waves using a range gate delay and a range gate window that correspond with ultrasonic waves from the adhesive ultrasonic coupling layer; and detect the one or more imperfections according to the ultrasonic waves.

6. The apparatus of claim 1, wherein the target object is a wrist, a digit or a test pattern.

7. The apparatus of claim 1, further comprising an attachment system configured for attaching the apparatus to a user's body, wherein the attachment system includes one or more attachment devices.

8. The apparatus of claim 7, wherein the attachment system comprises a strap configured for attaching the apparatus to the user's wrist or upper arm.

9. The apparatus of claim 1, wherein the control system is further configured to:

determine, based at least in part on the first ultrasonic sensor data and the second ultrasonic sensor data, whether the adhesive ultrasonic coupling layer is properly attached to the outer surface of the apparatus; and control the user interface system to provide a prompt to adjust or replace the adhesive ultrasonic coupling layer responsive to determining that the adhesive ultrasonic coupling layer is not properly attached to the outer surface of the apparatus.

10. The apparatus of claim 1, wherein the ultrasonic receiver system is a component of an ultrasonic sensor system or a photoacoustic sensor system.

11. A method of controlling an apparatus that includes an ultrasonic receiver system, the method comprising:

receiving, by a control system, and via the ultrasonic receiver system, first ultrasonic sensor data from a target object when the apparatus is in a first position relative to the target object;

controlling, by the control system, a user interface system to provide a prompt to rotate or translate the apparatus to a second position relative to the target object;

receiving, by the control system and via the ultrasonic receiver system, second ultrasonic sensor data from the target object when the apparatus is in the second position;

detecting, by the control system and based at least in part on one or more differences between the first ultrasonic sensor data and the second ultrasonic sensor data, one or more imperfections in, on or proximate an adhesive ultrasonic coupling layer on an outer surface of the apparatus; and controlling, by the control system, the user interface system to provide a prompt to adjust or replace the adhesive ultrasonic coupling layer responsive to detecting the one or more imperfections in, on or proximate the adhesive ultrasonic coupling layer.

12. The method of claim 11, wherein the user interface system includes a display and wherein the method involves controlling the display to provide at least part of the prompt.

13. The method of claim 11, wherein the method involves detecting one or more air bubbles or contaminants between the adhesive ultrasonic coupling layer and the outer surface of the apparatus.

14. The method of claim 11, wherein the method involves detecting one or more instances of damage to the adhesive ultrasonic coupling layer.

15. The method of claim 11, wherein the method involves:

controlling the ultrasonic receiver system to receive ultrasonic waves using a range gate delay and a range gate window that correspond with the adhesive ultrasonic coupling layer; and detecting the one or more imperfections according to ultrasonic sensor data corresponding to the ultrasonic waves.

16. An apparatus, comprising:

an ultrasonic receiver system;

a user interface system; and control means for:

receiving, via the ultrasonic receiver system, first ultrasonic sensor data from a target object when the apparatus is in a first position relative to the target object;

controlling the user interface system to provide a prompt to rotate or translate the apparatus to a second position relative to the target object;

receiving, via the ultrasonic receiver system, second ultrasonic sensor data from the target object when the apparatus is in the second position;

determining, based at least in part on one or more differences between the first ultrasonic sensor data and the second ultrasonic sensor data, whether there are one or more imperfections in, on or proximate an adhesive ultrasonic coupling layer on an outer surface of the apparatus; and controlling the user interface system to provide a prompt to adjust or replace the adhesive ultrasonic coupling layer responsive to detecting one or more imperfections in, on or proximate the adhesive ultrasonic coupling layer.

17. The apparatus of claim 16, wherein the control means includes means for:

detecting, based at least in part on the first ultrasonic sensor data and the second ultrasonic sensor data, one or more imperfections in, on or proximate an adhesive ultrasonic coupling layer on an outer surface of the apparatus; and controlling the user interface system to provide a prompt to adjust or replace the adhesive ultrasonic coupling layer responsive to detecting the one or more imperfections in, on or proximate the adhesive ultrasonic coupling layer.

18. The apparatus of claim 16, wherein the control means includes means for detecting one or more air bubbles or contaminants between the adhesive ultrasonic coupling layer and the outer surface of the apparatus.

19. The apparatus of claim 16, wherein the control means includes means for detecting one or more instances of damage to the adhesive ultrasonic coupling layer.

20. The apparatus of claim 16, further comprising attachment means for attaching the apparatus to a user's body.

21. The apparatus of claim 16, wherein the ultrasonic receiver system is a component of an ultrasonic sensor system or a photoacoustic sensor system.

* * * * *